(12) United States Patent
Ido

(10) Patent No.: US 12,543,221 B2
(45) Date of Patent: Feb. 3, 2026

(54) POWER CONVERSION DEVICE

(71) Applicant: Mitsubishi Electric Corporation, Tokyo (JP)

(72) Inventor: Yasunori Ido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 333 days.

(21) Appl. No.: 18/551,696

(22) PCT Filed: Mar. 29, 2021

(86) PCT No.: PCT/JP2021/013339
§ 371 (c)(1),
(2) Date: Sep. 21, 2023

(87) PCT Pub. No.: WO2022/208619
PCT Pub. Date: Oct. 6, 2022

(65) Prior Publication Data
US 2024/0172285 A1    May 23, 2024

(51) Int. Cl.
*H04W 74/08*    (2024.01)
*H04W 74/0816*    (2024.01)
*H04W 84/20*    (2009.01)

(52) U.S. Cl.
CPC ........ *H04W 74/0816* (2013.01); *H04W 84/20* (2013.01)

(58) Field of Classification Search
CPC .......................... H04W 74/0816; H04W 84/20
See application file for complete search history.

(56) References Cited

U.S. PATENT DOCUMENTS 10,205,402 B2 * 2/2019 Fujii ...................... H02M 1/12
2011/0019442 A1 1/2011 Yamada et al.
(Continued)

FOREIGN PATENT DOCUMENTS

EP    3352363 A1    7/2018
JP    2011024390 A    2/2011
(Continued)

OTHER PUBLICATIONS

International Search Report (PCT/ISA/210) with translation and Written Opinion (PCT/ISA/237) mailed on May 25, 2021, by the Japan Patent Office as the International Searching Authority for International Application No. PCT/JP2021/013339. (8 pages).
(Continued)

*Primary Examiner* — Rafael O De Leon Domenech
(74) *Attorney, Agent, or Firm* — Buchanan Ingersoll & Rooney PC

(57) ABSTRACT

In a power conversion device, a plurality of channels of a first multiple access method are respectively allocated to a plurality of groups. A plurality of subchannels of a second multiple access method which are divisions of a corresponding channel of the first multiple access method are respectively allocated to a plurality of wireless nodes included in each of the plurality of groups. A first transmitter of each wireless node transmits individual information received from a connected submodule to a second receiver of a control protection device via an allocated channel and subchannel. A second transmitter of the control protection device simultaneously transmits a common control protection command to respective first receivers of the plurality of wireless nodes via a channel that is different from the plurality of channels of the first multiple access method.

7 Claims, 11 Drawing Sheets

(56) References Cited

U.S. PATENT DOCUMENTS

2017/0317673 A1   11/2017  Kang et al.
2019/0044427 A1*  2/2019  Fujii .................... H02M 7/483
2021/0075339 A1   3/2021  Ido et al.
2022/0399831 A1  12/2022  Ido

FOREIGN PATENT DOCUMENTS

JP       2017060358 A    3/2017
JP       2017201866 A   11/2017
JP         6755436 B1    9/2020

OTHER PUBLICATIONS

Extended European Search Report dated Apr. 10, 2024, issued in the corresponding European Patent Application No. 21934792.9, 11 pages.
Luvisotto, et al., "High-Performance Wireless Networks for Industrial Control Applications: New Targets and Feasibility", Proceedings of the IEEE, vol. 107, No. 6, Jun. 2019, pp. 1074-1093.

* cited by examiner

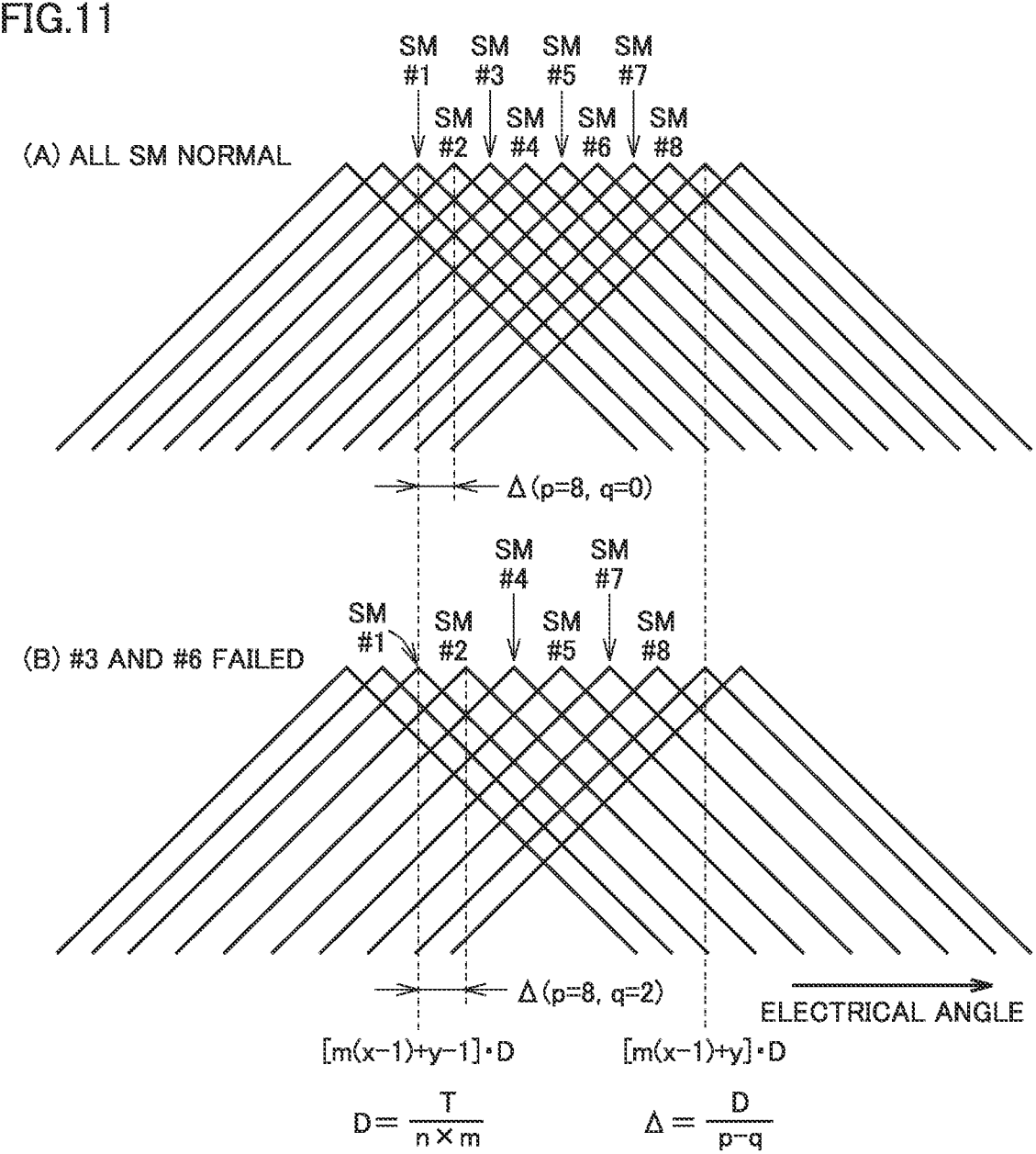

POWER CONVERSION DEVICE

TECHNICAL FIELD

The present disclosure relates to a power conversion device.

BACKGROUND ART

In a power conversion device of a modular multilevel converter (MMC) system, optical fiber communication has been conventionally used for communication between a control protection device and multiple submodules.

PTL 1 (Japanese Patent Laying-Open No. 2017-60358) discloses a method for transmitting a voltage command value to a slave control device of each submodule from a central control device by wireless communication for reducing the costs. Furthermore, a slave control device of each submodule transmits a capacitor voltage detection value to the central control device by wireless communication.

CITATION LIST

Patent Literature

PTL 1: Japanese Patent Laying-Open No. 2017-60358

SUMMARY OF INVENTION

Technical Problem

PTL 1 (Japanese Patent Laying-Open No. 2017-60358) does not specifically disclose how a wireless device on the central control device side and a plurality of wireless communication devices on the slave control device side avoid collision of communication signals. If a plurality of wireless devices on the submodule side located within a range where electric waves reach simultaneously conduct transmission, transmitted electric waves collide with each other to damage communication data. This results in necessity of a retransmitting process for retransmitting damaged communication data, leading to the problems of deterioration in communication efficiency and extension of communication cycle.

As a measure for avoiding collision, a method of detecting an electric wave transmitted by other wireless device and waiting for end of communication before starting transmission of the own wireless device is conceivable. In this case, communication frequencies of the wireless devices are not uniform, and there exist a wireless device whose transmission waiting time is short, and a wireless device whose transmission waiting time is long. Therefore, the entire transmission cycle becomes long because it should be set in accordance with the case where the waiting time is long.

The tenth embodiment of the PTL 1 discloses transmitting a detection value of capacitor voltage only once in a plurality of wireless communication cycles on the precondition that the time constant of the capacitor voltage is sufficiently large. However, such a method cannot sufficiently control the capacitor voltage and does not give an essential solution for shortening the communication cycle.

The present disclosure has been devised in light of the above problem, and an object of the present disclosure is to provide a wireless communication method capable of conducting interactive communication between a control protection device and each submodule in a power conversion device of a MMC system.

Solution to Problem

A power conversion device of one embodiment includes: an arm including a plurality of submodules, the plurality of submodules each being used as a unit converter, and being mutually cascade-connected: a plurality of wireless nodes each including a first receiver and a first transmitter: and a control protection device. Each of the plurality of wireless nodes is connected to a corresponding plurality of submodules among the plurality of submodules constituting the arm by wired communication. Each of the plurality of wireless nodes transmits a gate control signal based on a control protection command received via the first receiver to each of the corresponding plurality of submodules, and transmits individual information received from the corresponding plurality of submodules via the first transmitter. The plurality of wireless nodes are divided into a plurality of groups. A plurality of channels of a first multiple access method are each allocated to a corresponding one of the plurality of groups, and a plurality of subchannels of a second multiple access method are each allocated to a corresponding one of a plurality of wireless nodes included in each of the plurality of groups. The plurality of subchannels are divisions of a corresponding channel of the first multiple access method. The first transmitter of each of the plurality of wireless nodes transmits the individual information via an allocated channel and subchannel. The control protection device includes a second transmitter and a plurality of second receivers. The second transmitter simultaneously transmits the control protection command that is common to the first receiver of each of the plurality of wireless nodes via a channel that is different from the plurality of channels of the first multiple access method. The plurality of second receivers are each provided for a corresponding one of the plurality of groups, and each second receiver receives the individual information from the plurality of wireless nodes included in a corresponding group via a channel allocated to the corresponding group.

Advantageous Effects of Invention

According to the above embodiment, it is possible to achieve short-cycle interactive wireless communication between the control protection device and each submodule by utilizing the plurality of channels of the first multiple access method and the plurality of subchannels of the second multiple access method.

BRIEF DESCRIPTION OF DRAWINGS

FIG. 11 is a view for illustrating readjustment of a phase shift amount at the time of failure of a submodule.

DESCRIPTION OF EMBODIMENTS

Hereinafter, each embodiment will be specifically described with reference to the drawings. It is to be noted that the same or corresponding part is denoted by the same reference sign, and description thereof will not be repeated.

Embodiment 1

[Overall Configuration of Power Conversion Device]

Figure 1:
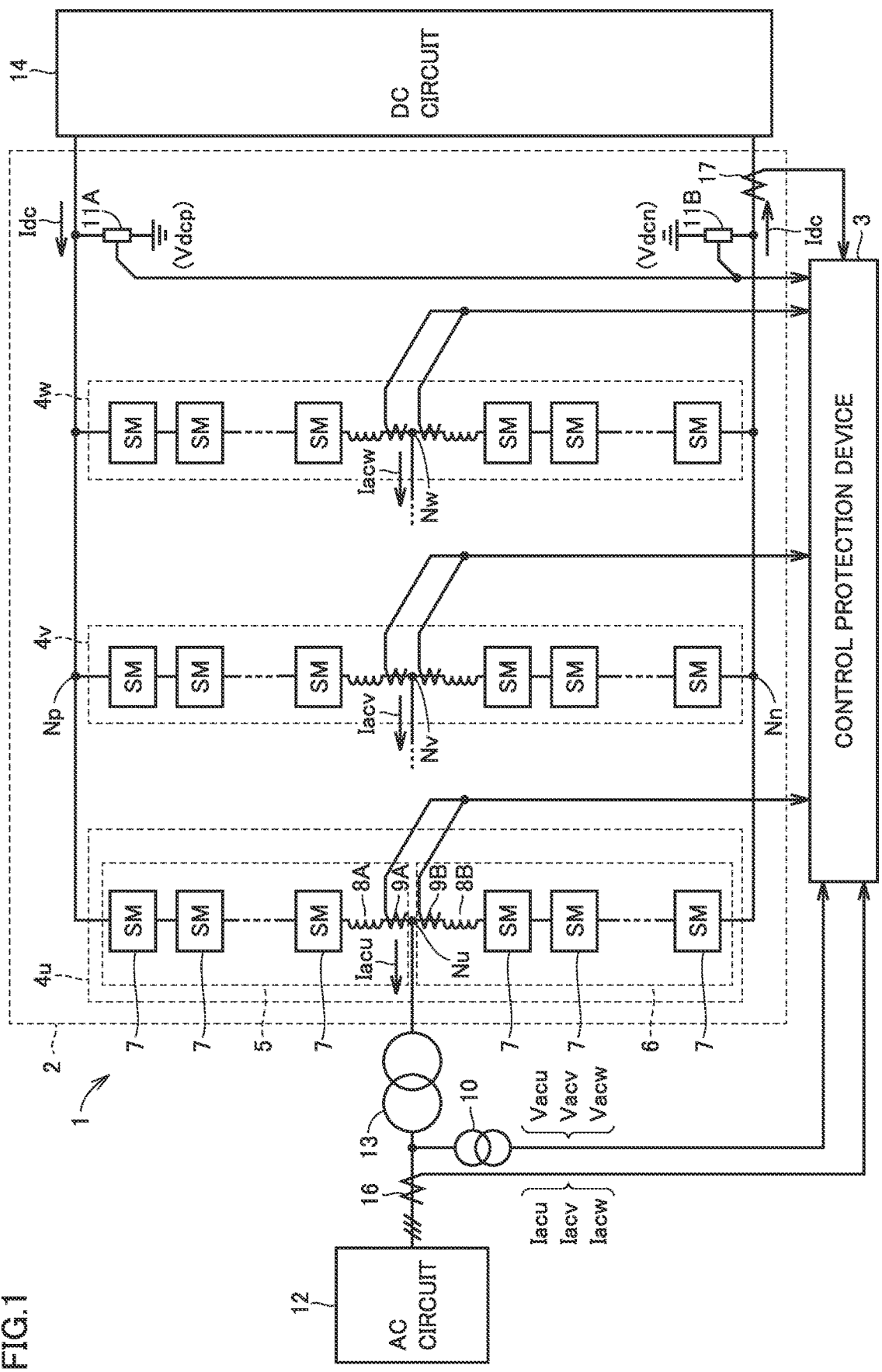
FIG. 1 is a schematic configuration diagram of power conversion device 1 according to the present embodiment.

FIG. 1 is a schematic configuration diagram of a power conversion device 1 according to the present embodiment. Referring to FIG. 1, power conversion device 1 is configured by a modular multilevel converter including a plurality of submodules (SM) 7 that are connected to each other in series. "Submodule" is also called "converter cell" or "unit converter".

While a configuration example of submodule 7 will be described later by referring to FIG. 7, a brief description is given here. Submodule 7 includes input/output (I/O) terminals 86P, 86N, a DC (direct current) capacitor 84 as an electricity storage element, and a bridge circuit 80HB that connects DC capacitor 84 to I/O terminals 86P, 86N. By controlling bridge circuit 80HB, it is possible to output a voltage of DC capacitor 84 or a zero voltage between I/O terminal 86P and I/O terminal 86N. The voltage of DC capacitor 84 is also called a capacitor voltage.

Power conversion device 1 conducts power conversion between a DC circuit 14 and an AC (alternating current) circuit 12. Power conversion device 1 includes a power converter 2 and a control protection device 3.

Power converter 2 includes a plurality of leg circuits 4u, 4v, 4w (described as leg circuit 4 when they are collectively referred to, or any one of them is indicated) connected to each other in parallel between a positive DC terminal (namely, high-potential side DC terminal) Np and a negative DC terminal (namely, low-potential side DC terminal) Nn.

Leg circuit 4 is provided for each of a plurality of phases constituting alternating current. Leg circuit 4 is connected between AC circuit 12 and DC circuit 14, and conducts power conversion between these circuits. FIG. 1 shows the case where AC circuit 12 is a three-phase AC system, and three leg circuits 4u, 4v, 4w are provided respectively in correspondence with U phase, V phase, W phase.

AC input terminals Nu, Nv, Nw respectively provided in leg circuits 4u, 4v, 4w are connected to AC circuit 12 via a transformer 13. AC circuit 12 is, for example, an AC electric power system including an AC power supply. In FIG. 1, connection between AC input terminals Nv, Nw and transformer 13 is not illustrated for facilitating illustration.

High-potential side DC terminal Np and low-potential side DC terminal Nn connected commonly to each leg circuit 4 are connected to DC circuit 14. DC circuit 14 is, for example, a DC electric power system including a DC transmission network or DC terminals of other power conversion device. In the latter case, a BTB (Back To Back) system for connecting AC electric power systems having different rated frequencies by coupling two power conversion devices is configured.

Instead of using transformer 13 of FIG. 1, connection to AC circuit 12 may be configured via an interconnection reactor. Further, a primary coil may be provided for each of leg circuits 4u, 4v, 4w in place of AC input terminals Nu, Nv, Nw, and leg circuits 4u, 4v, 4w may be connected to transformer 13 or the interconnection reactor in an alternating current manner via a secondary coil that magnetically couples with the primary coil. In this case, the primary coils may be reactors 8A, 8B described below. Summarizing the above, leg circuit 4 is electrically (namely, in a direct current manner or in an alternating current manner) connected to AC circuit 12 via a connecting portion provided in each of leg circuits 4u, 4v, 4w, such as AC input terminals Nu, Nv, Nw or the aforementioned primary coil.

Leg circuit 4u includes an upper arm 5 from high-potential side DC terminal Np to AC input terminal Nu, and a lower arm 6 from low-potential side DC terminal Nn to AC input terminal Nu. AC input terminal Nu that is a connecting point between upper arm 5 and lower arm 6 is connected to transformer 13. High-potential side DC terminal Np and low-potential side DC terminal Nn are connected to DC circuit 14. Leg circuits 4v, 4w also have the same configurations, and thus, a configuration of leg circuit 4u is representatively described.

Upper arm 5 includes a plurality of submodules 7 that are cascade connected, and reactor 8A. Plurality of submodules 7 and reactor 8A are connected to each other in series. Similarly, lower arm 6 includes a plurality of submodules 7 that are cascade connected, and reactor 8B. Plurality of submodules 7 and reactor 8B are connected to each other in series. In the following description, the number of submodules 7 included in each of upper arm 5 and lower arm 6 is denoted by Ncell. It is to be noted that Ncell≥2.

The position where reactor 8A is inserted may be any position of upper arm 5 of leg circuit 4u, and the position where reactor 8B is inserted may be any position of lower arm 6 of leg circuit 4u. Each of reactors 8A, 8B may be provided plurally. Inductance values of reactors may be different from each other. Further, only reactor 8A of upper arm 5 or only reactor 8B of lower arm 6 may be provided. Also, by cancelling the magnetic flux of the DC current and letting leakage reactance of the transformer act on the AC current by contriving the wiring of the transformer, the reactors may be substituted. By providing reactors 8A, 8B, it is possible to suppress rapid increase in fault current at the time of a fault of AC circuit 12 or DC circuit 14 or the like.

Power conversion device 1 further includes as detectors that measure electrical quantities (current, voltage and so on) to be used for control, an AC voltage detector 10, an AC current detector 16, DC voltage detectors 11A, 11B, arm current detectors 9A, 9B provided in each leg circuit 4, and a DC current detector 17. Signals detected by these detectors are input to control protection device 3.

In FIG. 1, signal lines for signals input from each detector to control protection device 3 are partly described collectively for facilitating illustration, although a signal line is actually provided for each detector. Signal lines are configured, for example, by optical fibers.

Next, each detector is specifically described.

AC voltage detector 10 detects AC voltage Vacu of U phase, AC voltage Vacv of V phase, and AC voltage Vacw of W phase of AC circuit 12. In the following description, Vacu, Vacv, and, Vacw are also collectively denoted by Vac.

AC current detector 16 detects AC current Iacu of U phase, AC current Iacv of V phase, and AC current Iacw of W phase of AC circuit 12. In the following description, Iacu, Iacv, and, Iacw are also collectively denoted by Iac.

DC voltage detector 11A detects DC voltage Vdcp of high-potential side DC terminal Np connected to DC circuit 14. DC voltage detector 11B detects DC voltage Vdcn of low-potential side DC terminal Nn connected to DC circuit 14. Difference between DC voltage Vdcp and DC voltage Vdcn is referred to as DC voltage Vdc. DC current detector 17 detects DC current Idc flowing in high-potential side DC terminal Np or low-potential side DC terminal Nn.

Arm current detectors 9A and 9B provided in leg circuit 4u for U phase respectively detect upper arm current Ipu flowing in upper arm 5 and lower arm current Inu flowing in lower arm 6. Arm current detectors 9A and 9B provided in leg circuit 4v for V phase respectively detect upper arm current Ipv and lower arm current Inv. Arm current detectors 9A and 9B provided in leg circuit 4w for W phase respectively detect upper arm current Ipw and lower arm current Inw. In the following description, upper arm currents Ipu, Ipv, Ipw are also collectively described as upper arm current Iarmp, lower arm currents Inu, Inv, Inw are also collectively described as lower arm current Iarmn, and upper arm currents Iarmp and lower arm current Iarmn are also collectively described as Iarm.

[Schematic Configuration of Control Protection Device]

Figure 2:
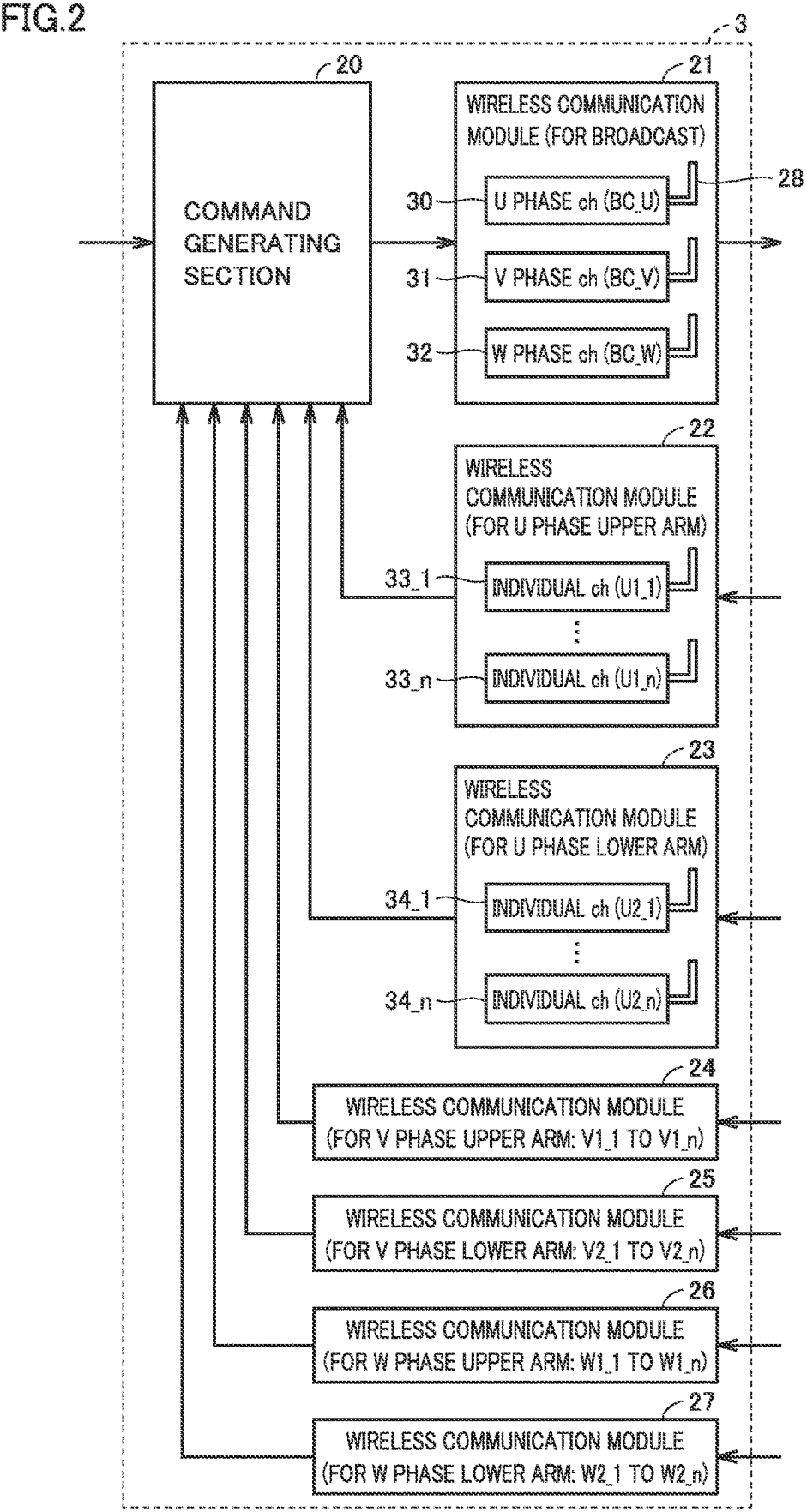
FIG. 2 is a block diagram showing a schematic configuration of a control protection device.

FIG. 2 is a block diagram showing a schematic configuration of a control protection device. Referring to FIG. 2, control protection device 3 includes a command generating section 20 and wireless communication modules 21 to 27. For interactive communication (duplex) and multiple access, a plurality of channels are allocated to each wireless communication module.

Command generating section 20 generates a voltage command value of each arm on the basis of a voltage value and a current value detected by respective detectors in FIG. 1, and a capacitor voltage collected from each submodule 7. Further, command generating section 20 generates a protection command such as a gate block for protecting power converter 2. A hardware configuration example and a functional configuration example of command generating section 20 will be described later by referring to FIG. 3 and FIG. 4.

Wireless communication module 21 simultaneously transmits (broadcasts) a voltage command value to wireless nodes of the submodule side. In the case of FIG. 2, wireless communication module 21 includes three transmitters 30 to 32 that conduct wireless communication via an antenna 28. To transmitters 30, 31, 32, channels BC_U, BC_V, BC_W of the first multiple access method are respectively allocated. Here, the first multiple access method is one of frequency division multiple access, time division multiple access, code division multiple access and so on, and typically frequency division multiple access is used.

Specifically, transmitter 30 provided in wireless communication module 21 of control protection device 3 simultaneously transmits U phase upper arm voltage command value Vprefu and U phase lower arm voltage command value Vnrefu to n×m wireless nodes arranged on the submodule side of the U phase upper arm via channel BC_U. Transmitter 31 simultaneously transmits V phase upper arm voltage command value Vprefv and V phase lower arm voltage command value Vnrefv to a plurality of wireless nodes 62 arranged on the V phase submodule side via channel BC_V. Transmitter 32 simultaneously transmits W phase upper arm voltage command value Vprefw and W phase lower arm voltage command value Vnrefw to a plurality of wireless nodes 62 arranged on the W phase submodule side via channel BC_W. Transmitters 30 to 32 further transmit a protection command for protecting submodules 7 of the corresponding arm.

Here, a total of six transmitters may be provided so as to allocate individual channels to upper arm voltage command values and lower arm voltage command values, and the way of allocating channels for broadcasting is not particularly limited.

Wireless communication modules 22 to 27 receive individual information from a plurality of wireless nodes provided on the submodule side. This communication uses a plurality of channels according to the first multiple access method, and a plurality of subchannels according to a second multiple access method, which are obtainable by further dividing each channel. While the first multiple access method used in wireless communication modules 22 to 27 is the same multiple access method as that in the above case of wireless communication module 21, channels to be allocated are different.

Typically, frequency division multiple access is used for the first multiple access method, and time division multiple access is used for the second multiple access method. By using time division multiple access, time slot management becomes necessary in each wireless node 62 on the submodule 7 side. On the other hand, time slot management is not necessary in each of wireless communication modules 22 to 27 of control protection device 3, and there is a merit that only management of frequency channels of the first multiple access method is required.

More specifically, wireless communication module 22 is provided for U phase upper arm, and includes n receivers 33_1 to 33_n that conduct wireless communication via antenna 28. To n receivers 33_1 to 33_n, n channels U1_1 to U1_n of the first multiple access method are respectively allocated. Wireless communication module 23 is provided for U phase lower arm, and includes n receivers 34_1 to 34_n. To n receivers 34_1 to 34_n, n channels U2_1 to U2_n of the first multiple access method are respectively allocated.

Similarly, wireless communication module 24 for V phase upper arm includes n receivers to which n channels V1_1 to V1_n of the first multiple access method are respectively allocated. Wireless communication module 25 for V phase lower arm includes n receivers to which n channels V2_1 to V2_n of the first multiple access method are respectively allocated. Wireless communication module 26 for W phase upper arm includes n receivers to which n channels W1_1 to W1_n of the first multiple access method are respectively allocated. Wireless communication module 27 for W phase lower arm includes n receivers to which n channels W2_1 to W2_n of the first multiple access method are respectively allocated.

Figure 5:
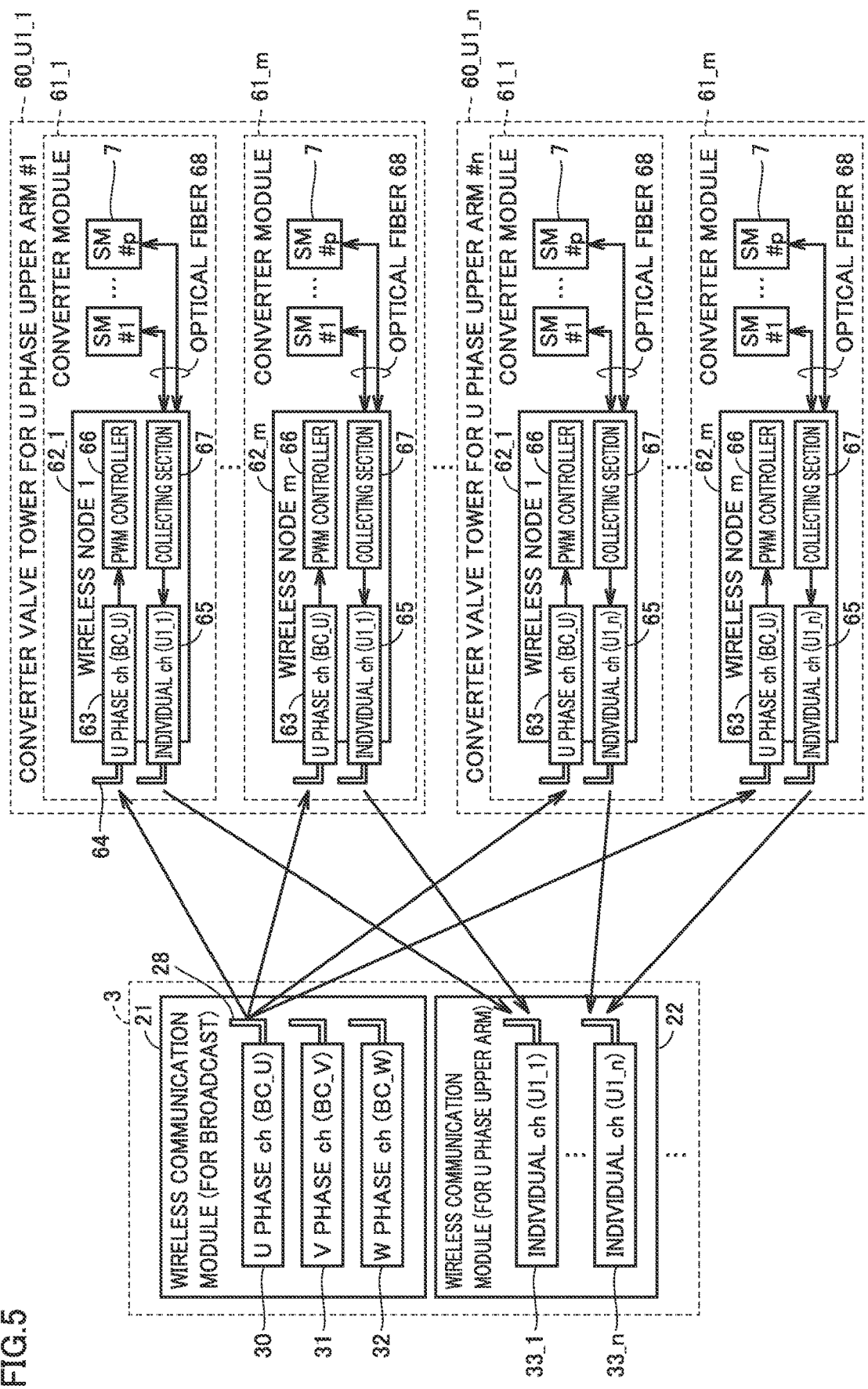
FIG. 5 is a block diagram showing a configuration example of a plurality of wireless nodes on a submodule side.
Figure 6:
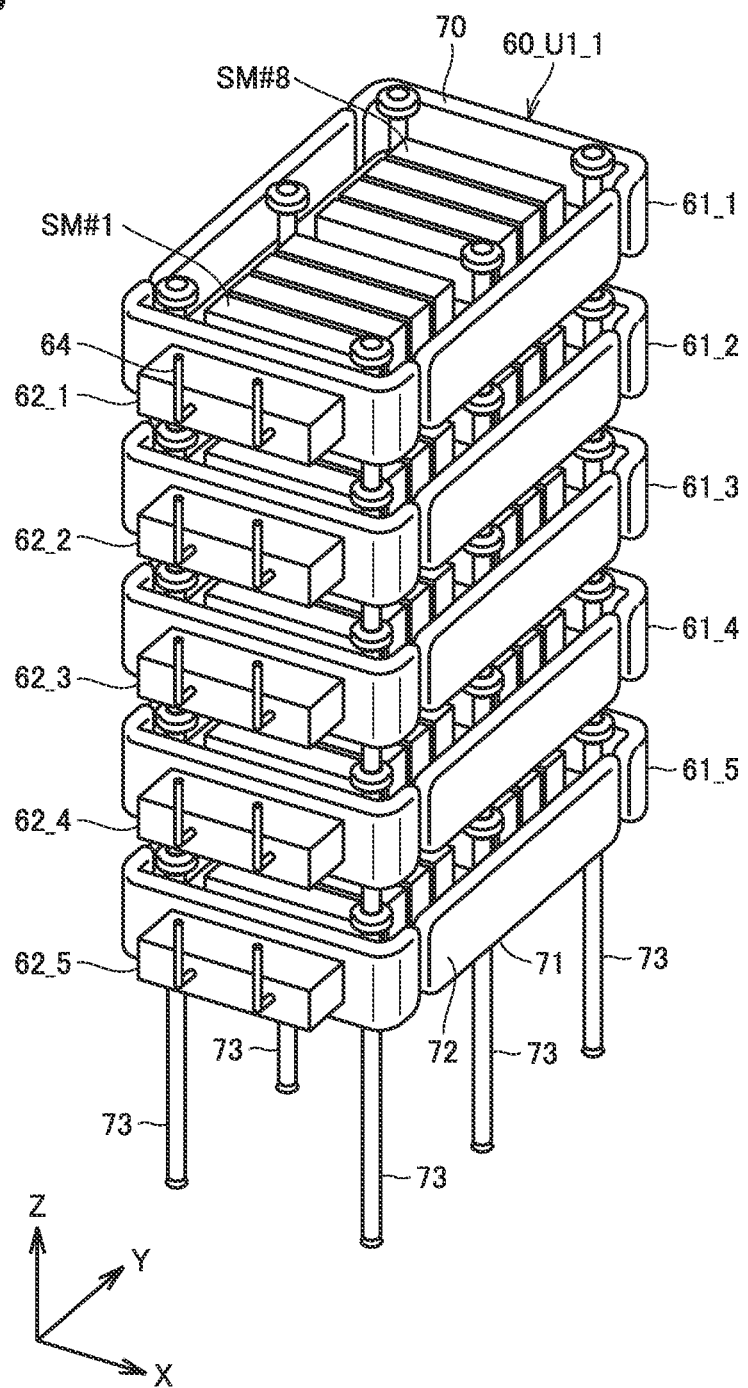
FIG. 6 is a perspective view showing a configuration example of a converter valve tower.

Therefore, to wireless communication modules 21 to 27 shown in FIG. 2, 6×n+3 [number] channels of the first multiple access method are allocated. More specific communication method on control protection device 3 side, and a communication method and a hardware configuration on submodule 7 side will be described later by referring to FIG. 5 and FIG. 6.

[Hardware Configuration Example of Command Generating Section]

Figure 3:
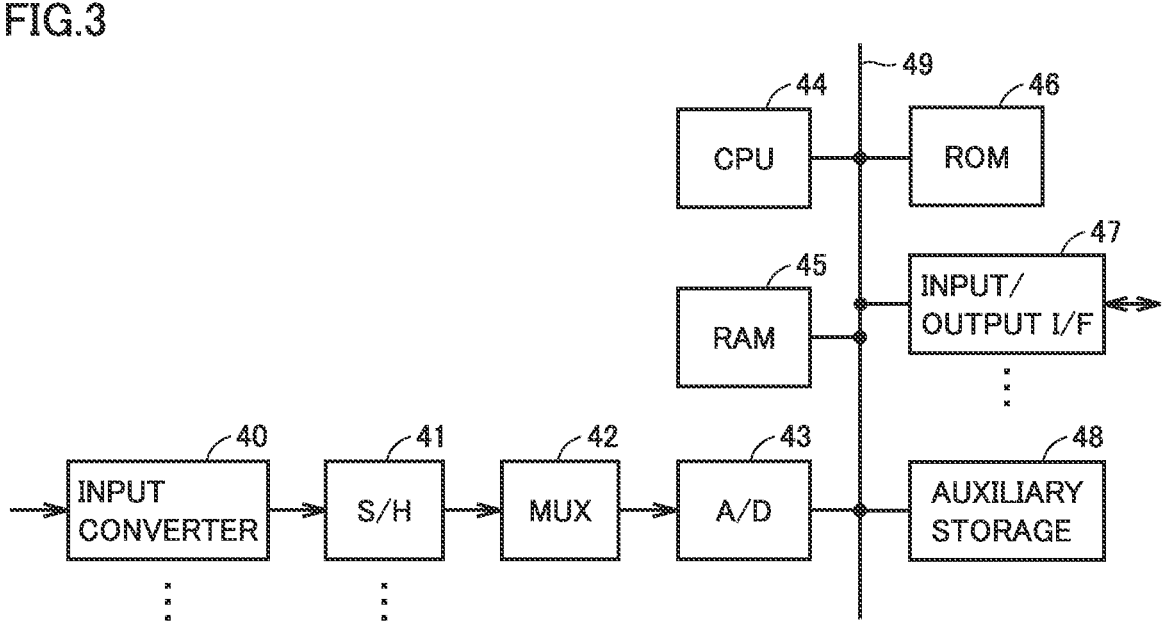
FIG. 3 is a block diagram showing a hardware configuration example of a command generating section of FIG. 2.

FIG. 3 is a block diagram showing a hardware configuration example of a command generating section of FIG. 2. FIG. 3 illustrates an example of configuring command generating section 20 by a computer.

Referring to FIG. 3, command generating section 20 includes at least one input converter 40, at least one sample hold (S/H) circuit 41, a multiplexer (MUX) 42, and an A/D (Analog to Digital) converter 43. Further, command generating section 20 includes at least one CPU (Central Processing Unit) 44, a RAM (Random Access Memory) 45, and a ROM (Read Only Memory) 46. Further, command generating section 20 includes at least one input/output interface (I/F) 47, an auxiliary storage 48, and a bus 49 that mutually connect the aforementioned constituents.

Input converter 40 has an auxiliary transformer (not shown) for each input channel. Each auxiliary transformer converts a detection signal by each electrical quantity detector shown in FIG. 1 to a signal of a voltage level suited for the subsequent signal processing.

Sample hold circuit 41 is provided for each input converter 40. Sample hold circuit 41 samples and retains a signal representing an electrical quantity received from a corresponding input converter 40 with a specified sampling frequency.

Multiplexer 42 sequentially selects signals retained in plurality of sample hold circuits 41. A/D converter 43 converts a signal selected by multiplexer 42 into a digital value. A/D conversion may be executed in parallel for detection signals of a plurality of input channels by providing a plurality of A/D converters 43.

CPU 44 controls the whole of command generating section 20 and executes a processing according to a program. RAM 45 as volatile memory and ROM 46 as non-volatile memory are used as main storage of CPU 44. ROM 46 stores a program and setting values for signal processing and so on. Auxiliary storage 48 is nonvolatile memory having a larger capacity than ROM 46, and stores a program and data of electrical quantity detection values and so on.

Input/output interface 47 is an interface circuit at the time of communication between CPU 44 and wireless communication modules 21 to 27 of FIG. 2, and between CPU 44 and an external device.

Unlike the example of FIG. 3, at least part of command generating section 20 may be configured by using FPGA (Field Programmable Gate Array) and a circuit such as ASIC (Application Specific Integrated Circuit) and the like. That is, the function of each functional block described in FIG. 3 may be configured based on a computer illustrated in FIG. 3, and may be configured at least partly by using FPGA and a circuit such as ASIC and the like. Also, at least part of the function of each functional group may be configured by an analogue circuit.

[Functional Configuration Example of Command Generating Section]

Figure 4:
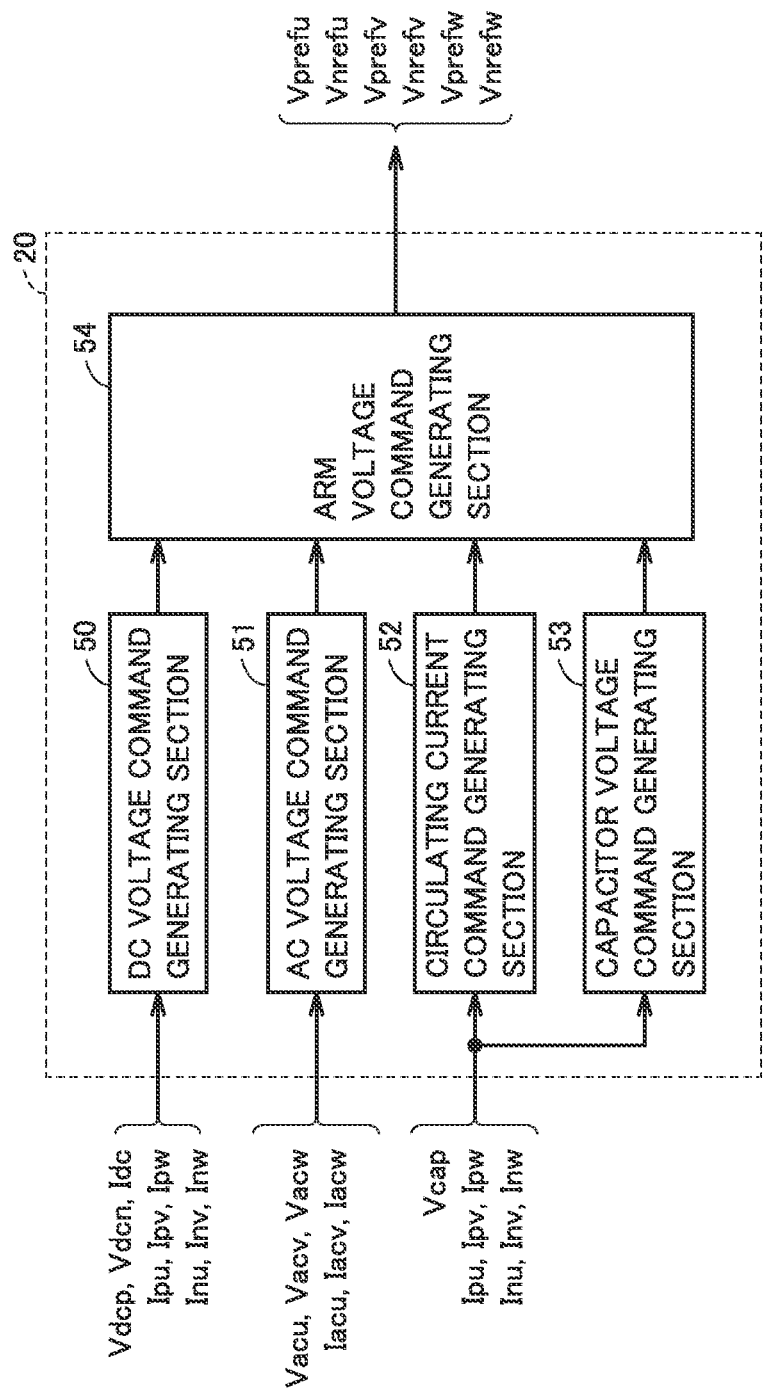
FIG. 4 is a block diagram showing a functional configuration example of a command generating section of FIG. 2.

FIG. 4 is a block diagram showing a functional configuration example of a command generating section of FIG. 2. Referring to FIG. 4, command generating section 20 includes a DC voltage command generating section 50, an AC voltage command generating section 51, a circulating current command generating section 52, a capacitor voltage command generating section 53, and an arm voltage command generating section 54.

DC voltage command generating section 50 generates a DC voltage command value on the basis of upper arm currents Ipu, Ipv, Ipw of each phase detected by arm current detector 9A, lower arm currents Inu, Inv, Inw of each phase detected by arm current detector 9B, DC voltage values Vdcp, Vdcn detected by DC voltage detectors 11A, 11B, and a DC current value Idc detected by DC current detector 17. DC voltage command generating section 50 is configured, for example, by a feedback controller such as a PID controller (Proportional-Integral-Differential Controller).

AC voltage command generating section 51 generates an AC voltage command value of each phase on the basis of AC voltage values Vacu, Vacv, Vacw of each phase detected by AC voltage detector 10, and AC current values Iacu, Iacv, Iacw of U phase, V phase, W phase detected by AC current detector 16. AC voltage command generating section 51 is configured, for example, by a feedback controller such as a PID controller.

Circulating current command generating section 52 first calculates circulating currents Iccu, Iccv, Iccw respectively flowing in leg circuits 4u, 4v, 4w on the basis of upper arm currents Ipu, Ipv, Ipw and lower arm currents Inu, Inv, Inw of each phase. The circulating current is a current circulating between plurality of leg circuits 4. For example, circulating current Iccu flowing in U phase leg circuit 4u can be calculated by $$Iccu=(Ipu+Inu)/2-Idc/3 \qquad (1).$$

Also circulating currents Iccv, Iccw can be calculated in the same manner.

Circulating current command generating section 52 calculates a command value of circulating current of each phase on the basis of calculated circulating currents Iccu, Iccv, Iccw of each phase, and capacitor voltage Vcap that is averaged for each arm circuit. Here, the capacitor voltage is voltage of a DC capacitor (also called electricity storage element) provided in each submodule 7 (the details are described later by referring to FIG. 7). Circulating current command generating section 52 is configured, for example, by a feedback controller such as a PID controller.

Capacitor voltage command generating section 53 generates a voltage command value of DC capacitor of each submodule 7 on the basis of capacitor voltage Vcap averaged for each arm circuit, and upper arm currents Ipu, Ipv, Ipw and lower arm currents Inu, Inv, Inw of each phase. Capacitor voltage command generating section 53 is configured, for example, by a feedback controller such as a PID controller.

Arm voltage command generating section 54 generates arm voltage command values Vprefu, Vnrefu, Vprefv for upper arm 5 of each phase, and arm voltage command values Vnrefv, Vprefw, Vnrefw for lower arm 6 of each phase by combining the command generating sections described above. Arm voltage command values Vprefu, Vnrefu, Vprefv, Vnrefv, Vprefw, Vnrefw of each phase are transmitted to wireless communication module 21 for broadcasting as voltage commands. In the following description, when the phase is not specified, a notation of arm voltage command values Vpref, Vnref can be simply used.

The functional configuration of command generating section 20 described above is merely one example, and a command generating section having other configuration may be applied to the present embodiment.

[Configuration Example of Wireless Nodes on Submodule Side]

FIG. 5 is a block diagram showing a configuration example of a plurality of wireless nodes on the submodule side. In FIG. 5, a configuration of wireless nodes on the U phase upper arm side, and wireless communication modules 21, 22 on the corresponding control protection device 3 side are shown. Wireless nodes for other arms are configured in the same manner.

As described by referring to FIG. 2, a wireless frequency band used in communication between control protection device 3 and a plurality of wireless nodes on submodule 7 side is divided into 3+6n channels by the first multiple access method. Three channels are used for simultaneously transmitting a control protection command including a voltage command value from control protection device 3 to submodule 7 side. The n channels for each arm are used for transmitting individual information of submodule 7 from submodule 7 side of each arm to control protection device 3.

Each of the n channels of the first multiple access method allocated for each arm are further divided into m subchannels by the second multiple access method that is different from the first multiple access method. The first multiple access method and the second multiple access method are different from each other, and are two access methods selected from frequency division multiple access, time division multiple access, code division multiple access and so on. Typically, frequency division multiple access is used as the first multiple access method, and time division multiple access is used as the second multiple access method.

Single wireless node 62 corresponds to each subchannel. Each wireless node 62 is connected to p submodules 7 via optical fibers 68. One wireless node 62 and p submodules 7 constitute converter module 61. Therefore, each arm of power converter 2 includes n×m converter modules 61 (namely, n×m wireless nodes 62), and includes n×m×p submodules 7. To one channel of the first multiple access method, m converter modules 61 (that is, m wireless nodes 62) correspond.

Hereinafter, m converter modules 61 corresponding to one channel of the first multiple access method are referred to as group. Each arm of power converter 2 includes n groups. As will be described later with reference to FIG. 6, each group corresponds to a converter valve tower.

As shown in FIG. 5, each wireless node 62 includes a receiver 63, a PWM (Pulse Width Modulation) controller 66, a collecting section 67, and a transmitter 65. These may be configured by a dedicated circuit, or may be configured by using FPGA or the like. Each of receiver 63 and transmitter 65 conducts wireless communication via antenna 64.

Receiver 63 receives a voltage command value from a transmitter of a corresponding phase (30 or 31 or 32) of wireless communication module 21 for broadcasting of control protection device 3 via a channel of the first multiple access method corresponding to the transmitter.

By comparing the voltage command value received by receiver 63 with a carrier signal, PWM controller 66 generates a gate control signal (also referred to as gate control pulse) according to phase shift PWM control for each submodule 7. The generated gate control signal is transferred to corresponding submodule 7 via optical fiber 68.

Collecting section 67 acquires individual information such as voltage value of electricity storage element (namely, capacitor voltage) and a device state and the like from each of p submodules 7. The device state is, for example, a flag value indicating a normal or abnormal state, and the factor of abnormality of each submodule 7.

Transmitter 65 transmits acquired individual information to a corresponding receiver provided in a corresponding wireless communication module of control protection device 3. For this information transmission, a channel of the first multiple access method, and a subchannel of the second multiple access method allocated to wireless node 62 to which transmitter 65 belongs are used.

Hereinafter, referring to FIG. 5, data transfer between wireless communication modules 21 and 22 of control protection device 3 and wireless node 62 on the U phase upper arm side is specifically described.

Transmitter 30 provided in wireless communication module 21 of control protection device 3 simultaneously transmits U phase upper arm voltage command value Vprefu and U phase lower arm voltage command value Vnrefu to n×m wireless nodes arranged on the submodule side of U phase upper arm via channel (also referred to as "ch") BC_U of the first multiple access method.

Each receiver 63 of m wireless nodes 62_1 to 62_m provided in group #i (i=1 to n) receives U phase upper arm voltage command value Vprefu and U phase lower arm voltage command value Vnrefu from transmitter 30 provided in wireless communication module 21 via channel BC_U of the first multiple access method.

Each transmitter 65 of m wireless nodes 62_1 to 62_m provided in group #i (i=1 to n) transmits individual information such as capacitor voltage and failure information of submodule 7 to i-th receiver 33_i provided in wireless communication module 22. For this transmission, channel U1_i of the first multiple access method, and a subchannel corresponding to each wireless node 62 of the second multiple access method are used.

The same applies to respective wireless nodes 62 of the U phase lower arm side, the V phase upper arm side, the V phase lower arm side, the W phase upper arm side, and the W phase lower arm side. A brief description follows.

Each of m wireless nodes 62_1 to 62_m provided in group #i (i=1 to n) of U phase lower arm is provided with receiver 63 and transmitter 65. Receiver 63 of each wireless node 62 receives U phase upper arm voltage command value Vprefu and U phase lower arm voltage command value Vnrefu from transmitter 30 provided in wireless communication module 21 via channel BC_U of the first multiple access method. Transmitter 65 of each wireless node 62 transmits individual information of submodule 7 to i-th receiver 33_i provided in wireless communication module 23 via channel U2_i of the first multiple access method, and a subchannel corresponding to each wireless node 62 of the second multiple access method.

Each of m wireless nodes 62_1 to 62_m provided in group #i (i=1 to n) of V phase upper arm is provided with receiver 63 and transmitter 65. Receiver 63 of each wireless node 62 receives V phase upper arm voltage command value Vprefv and V phase lower arm voltage command value Vnrefv from transmitter 31 provided in wireless communication module 21 via channel BC_V of the first multiple access method. Transmitter 65 of each wireless node 62 transmits individual information of submodule 7 to i-th receiver provided in wireless communication module 24 via channel V1_i of the first multiple access method, and a subchannel corresponding to each wireless node 62 of the second multiple access method.

Each of m wireless nodes 62_1 to 62_m provided in group #i (i=1 to n) of V phase lower arm is provided with receiver 63 and transmitter 65. Receiver 63 of each wireless node 62 receives V phase upper arm voltage command value Vprefv and V phase lower arm voltage command value Vnrefv from transmitter 31 provided in wireless communication module 21 via channel BC_V of the first multiple access method. Transmitter 65 of each wireless node 62 transmits individual information of submodule 7 to i-th receiver provided in wireless communication module 25 via channel V2_i of the first multiple access method, and a subchannel corresponding to each wireless node 62 of the second multiple access method.

Each of m wireless nodes 62_1 to 62_m provided in group #i (i=1 to n) of W phase upper arm is provided with receiver 63 and transmitter 65. Receiver 63 of each wireless node 62 receives W phase upper arm voltage command value Wprefw and W phase lower arm voltage command value Wnrefw from transmitter 32 provided in wireless communication module 21 via channel BC_W of the first multiple access method. Transmitter 65 of each wireless node 62 transmits individual information of submodule 7 to i-th receiver provided in wireless communication module 26 via channel W1_i of the first multiple access method, and a subchannel corresponding to each wireless node 62 of the second multiple access method.

Each of m wireless nodes 62_1 to 62_m provided in group #i (i=1 to n) of W phase lower arm is provided with receiver 63 and transmitter 65. Receiver 63 of each wireless node 62 receives W phase upper arm voltage command value Wprefw and W phase lower arm voltage command value Wnrefw from transmitter 32 provided in wireless communication module 21 via channel BC_W of the first multiple access method. Transmitter 65 of each wireless node 62 transmits individual information of submodule 7 to i-th receiver provided in wireless communication module 27 via channel W2_i of the first multiple access method, and a subchannel corresponding to each wireless node 62 of the second multiple access method.

In FIG. 5, transmitter 30 provided in wireless communication module 21 of control protection device 3 simultaneously transmits U phase upper arm voltage command value Vprefu and U phase lower arm voltage command value Vnrefu to all the wireless nodes of U phase via channel BC_U of the first multiple access method, however, BC_U may be divided into two channels, and one of the channels may be a channel for U phase upper arm, and the other of the channels may be a channel for U phase lower arm. In this case, the channel for U phase upper arm transmits only U phase upper arm voltage command value Vprefu, and the channel for U phase lower arm transmits only U phase lower arm voltage command value Vnrefu.

[Configuration Example of Converter Valve Tower]

FIG. 6 is a perspective view showing a configuration example of a converter valve tower. The perspective view of FIG. 6 shows a physical configuration example of a converter valve tower corresponding to first group 60_U1_1 for U phase upper arm of FIG. 5. In FIG. 6, the number m of converter modules 61 belonging to first group 60_U1_1 is 5, and the number p of submodules 7 belonging to each converter module 61 is 8.

As shown in FIG. 6, p (p=8) submodules 7 that constitute one converter module 61 are aligned in the Y direction, and arranged in an insulating container 70 in the form of a tray. Insulating container 70 in FIG. 6 shown as one example is configured by a generally rectangular bottom plate 71, and a lateral plate 72 standing up from the periphery of bottom plate 71. To lateral plate 72 on the front side (on the −Y direction side), wireless node 62 that constitutes converter module 61 is attached. Then, m (m=5) insulating containers 70 are stacked in the vertical direction (Z direction) while being supported by a support 73, and thus a converter valve tower is configured. Submodules 7 arranged in end parts of insulating containers 70 neighboring each other in the vertical direction are mutually connected by wiring (not shown) such as a bus-bar.

As described above, p submodules 7 and wireless node 62 that constitute the same converter module 61 are attached to the same insulating container 70. This can facilitate connection between wireless node 62 and each submodule 7 by optical fiber 68 (not shown in FIG. 6).

[Configuration Example of Submodule]

Figure 7:
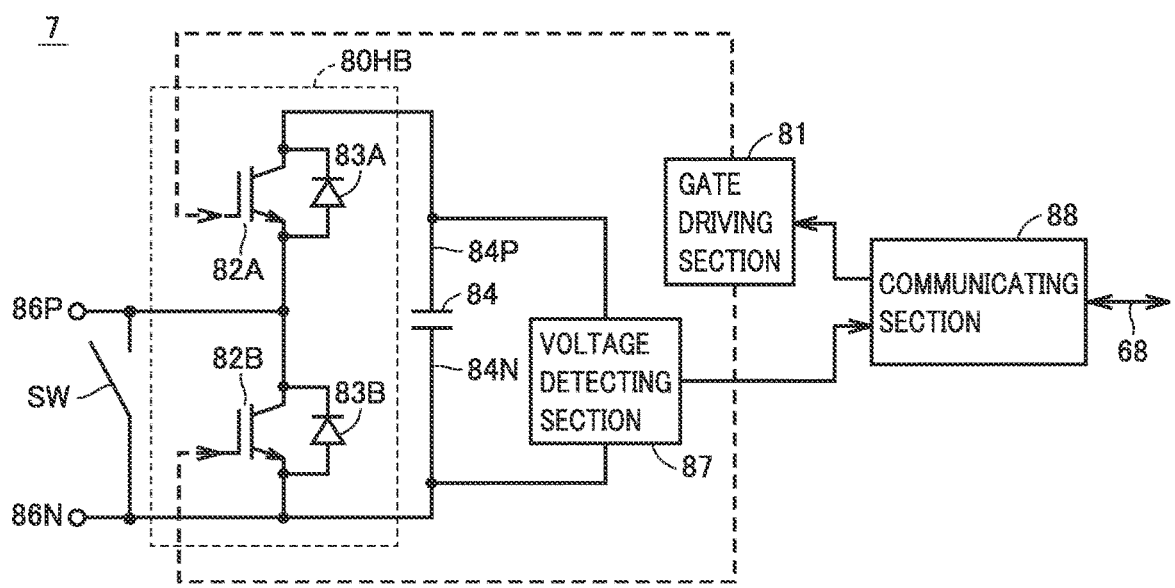
FIG. 7 is a circuit diagram showing one example of a submodule that configures each leg circuit of FIG. 1.

FIG. 7 is a circuit diagram showing one example of submodules constituting each leg circuit of FIG. 1, Submodule 7 shown in FIG. 7 includes a half-bridge type bridge circuit 80HB, a gate driving section 81, a DC capacitor 84 as an electricity storage element, a voltage detecting section 87, and a communicating section 88.

Half-bridge type bridge circuit 80HB includes switching devices 82A, 82B that are connected to each other in series, and diodes 83A, 83B. Diodes 83A, 83B are connected reverse-parallelly to switching devices 82A, 82B (that is, parallel and reverse bias direction). DC capacitor 84 is parallelly connected to serial connection circuits of switching devices 82A, 82B, and holds DC voltage. A connection node between switching devices 82A, 82B is connected to high-potential side I/O terminal 86P. A connection node between switching device 82B and DC capacitor 84 is connected to low-potential side I/O terminal 86N.

Typically, I/O terminal 86P is connected to I/O terminal 86N of submodule 7 that neighbors on the positive electrode side. I/O terminal 86N is connected to I/O terminal 86P of submodule 7 that neighbors on the negative electrode side.

As each switching device 82A, 82B, a self arc suppressing type switching device capable of controlling both ON operation and OFF operation is used. Switching devices 82A, 82B, are, for example, IGBT (Insulated Gate Bipolar Transistor) or GCT (Gate Commutated Turn-off thyristor).

A bypass switch SW is connected between I/O terminals 86P, 86N. Bypass switch SW is a switch configured to be able to short-circuit both ends of switching device 82B by closing a contact, and allows current-carrying of a fault current. In other words, bypass switch SW protects devices (switching devices 82A, 82B, diodes 83A, 83B and DC capacitor 84) included in submodule 7 from an overcurrent generated at the time of a fault, by short-circuiting submodule 7.

Bypass switch SW is also used in short-circuiting submodule 7 when a device of submodule 7 fails. As a result, even when any one submodule 7 of plurality of submodules 7 fails, power conversion device 1 can be continuously operated by using other submodules 7.

Voltage detecting section 87 detects voltage between both ends 84P, 84N of DC capacitor 84 (namely, capacitor voltage).

Communicating section 88 transfers ON/OFF command of switching devices 82A, 82B received from PWM controller 66 of corresponding wireless node 62 to gate driving section 81. Communicating section 88 further transmits abnormality determining information of submodule 7, and information of capacitor voltage detected by voltage detecting section 87 to collecting section 67 of corresponding wireless node 62.

Gate driving section 81 controls gate voltage of each switching device 82A, 82B according to ON/OFF command received from communicating section 88. When switching device 82A is in ON state, and switching device 82B is in OFF state, a voltage between ends of DC capacitor 84 is applied between I/O terminals 86P, 86N. Conversely, when switching device 82A is in OFF state, and switching device 82B is in ON state, voltage between I/O terminals 86P, 86N is 0 V.

Diodes 83A, 83B are provided for protection when reverse voltages are applied to switching devices 82A, 82B.

Gate driving section 81, voltage detecting section 87, and communicating section 88 described above may be configured by a dedicated circuit, or may be configured by using FPGA or the like.

While the configuration in which a bridge circuit of submodule 7 is a half-bridge type bridge circuit has been described above, the configuration is not limitative. For example, submodule 7 may be configured by using a full-bridge type bridge circuit, or a three-quarter-bridge type bridge circuit.

Effect of Embodiment 1

Hereinafter, features and effects of communication connection forms in the power conversion device of Embodiment 1 are summarized.

On each arm side of power converter 2, plurality of wireless nodes 62 capable of connecting plurality of submodules 7 are provided. Each wireless node 62 includes PWM controller 66 having PWM control function of plurality of submodules 7. As a result, it is possible to reduce the communication amount from control protection device 3 toward each submodule side compared with the case where PWM control function of each submodule is assigned to control protection device 3 side.

Each wireless node 62 independently has receiver 63 for receiving broadcast transmission of a control protection command from control protection device 3 and transmitter 65 for transmitting individual information (for example, capacitor voltage, device state and so on) of corresponding submodule 7. Different channels of the first multiple access method are allocated to receiver 63 and transmitter 65. This enables interactive simultaneous communication (duplex).

PWM control of plurality of submodules 7 can be achieved by one wireless node 62. Wireless node 62 and plurality of submodules 7 are connected to each other by optical fibers. Wireless node 62 transmits a gate control signal (also referred to as gate control pulse) based on PWM control to corresponding plurality of submodules 7. This makes it possible to reduce the number of wireless nodes 62 carried on power converter 2 as a whole.

Collecting section 67 of each wireless node 62 collects individual information such as capacitor voltage, device state and so on of connected submodule 7. A channel of the first multiple access method allocated to transmitter 65 of each wireless node 62 is further divided into a plurality of subchannels of the second multiple access method. Each wireless node 62 generates a transmission signal by using a corresponding channel of the first multiple access method, and a corresponding subchannel of the second multiple access method. By dividing the frequency band to be used in communication using the first multiple access method and the second multiple access method as described above, it is possible to realize low delay communication with little time loss.

Control protection device 3 carries plurality of wireless communication modules 21 to 27 for communication with plurality of wireless nodes 62 on submodule 7 side. Control protection device 3 carries wireless communication module 21 for broadcast communication for distribution of a control protection command. Wireless communication module 21 is provided for each phase or each arm, and different channels of the first multiple access method are allocated. Further, a plurality of different channels of the first multiple access method are allocated to each of wireless communication modules 22 to 27 provided for each arm.

In examples of FIG. 2 and FIG. 5, plurality of submodules and plurality of wireless nodes 62 of each arm are divided and carried on n converter valve towers 60. Converter valve tower 60 has insulating containers 70 having m stages in the vertical direction, and each insulating container 70 accommodates one wireless node 62 and p submodules 7. One channel of the first multiple access method is allocated to converter valve tower 60, and one subchannel of the second multiple access method is allocated to wireless node 62 of each insulating container 70. Such configuration can facilitate connection between wireless node 62 and each submodule 7 by optical fiber 68. Also, by unwiring communication between control protection device 3 and each converter valve tower 60, it is possible to reduce the cost for laying optical fibers.

Embodiment 2

In Embodiment 2, the case of using frequency division multiple access as the first multiple access method and using a time division multiple access method as the second multiple access method shown in Embodiment 1 is described.

[Allocating Example of Wireless Frequency]

Figure 8:
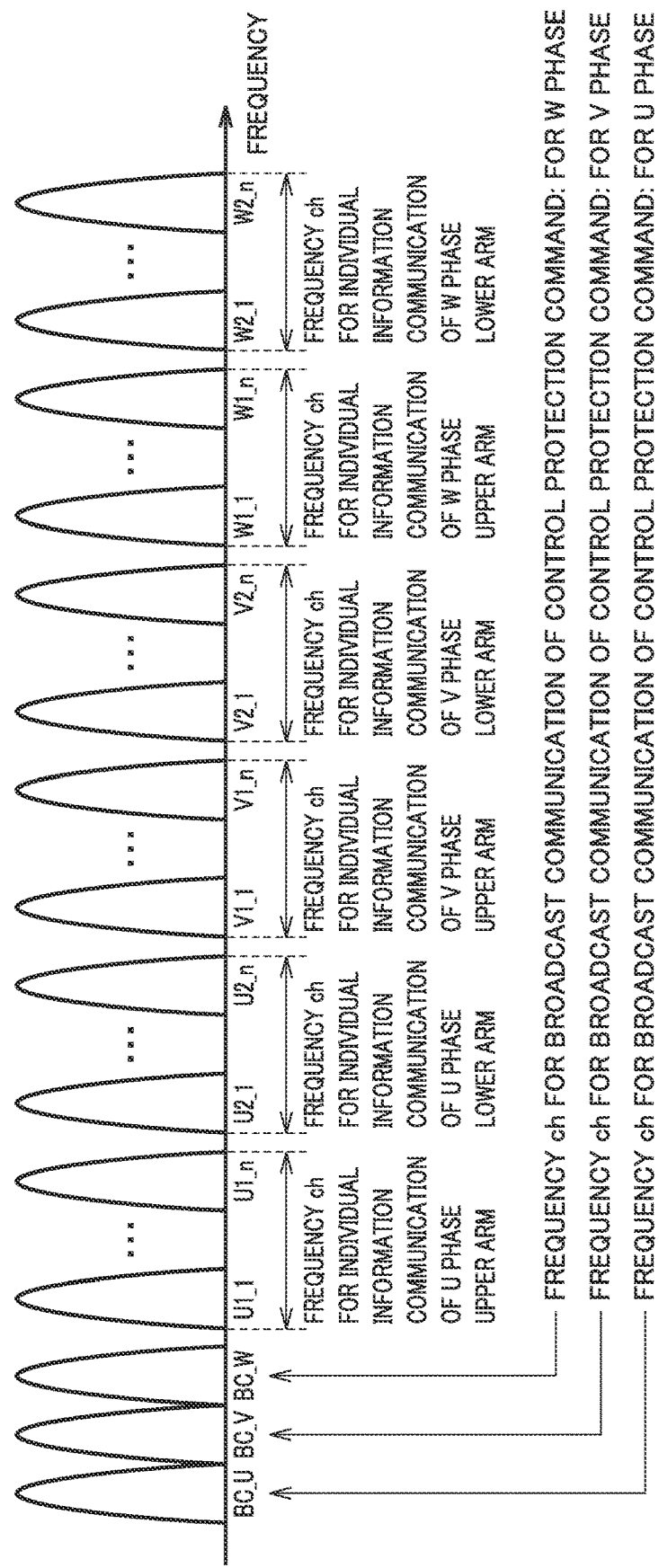
FIG. 8 is a chart showing a frequency allocating example according to a frequency division multiple access method.

FIG. 8 is a chart showing a frequency allocating example according to a frequency division multiple access method. In FIG. 8, three frequency channels are allocated for broadcast communication, and n frequency channels are allocated for communication of individual information of each arm. This avoids collision of communications and enables interactive simultaneous communication of multiple channels.

Specifically as shown in FIG. 8, for broadcast communication of control protection command of U phase, V phase, and W phase, frequency channels BC_U, BC_V, and BC_W are respectively allocated. For communication of individual information of U phase upper arm, n frequency channels U1_1 to U1_$n$ are allocated. For communication of individual information of U phase lower arm, n frequency channels U2_1 to U2_$n$ are allocated. For communication of individual information of V phase upper arm, n frequency channels V1_1 to V1_$n$ are allocated. For communication of individual information of V phase lower arm, n frequency channels V2_1 to V2_$n$ are allocated. For communication of individual information of W phase upper arm, n frequency channels W1_1 to W1_$n$ are allocated. For communication of individual information of W phase lower arm, n frequency channels W2_1 to W2_$n$ are allocated.

[Wireless Communication Flow]

Figure 9:
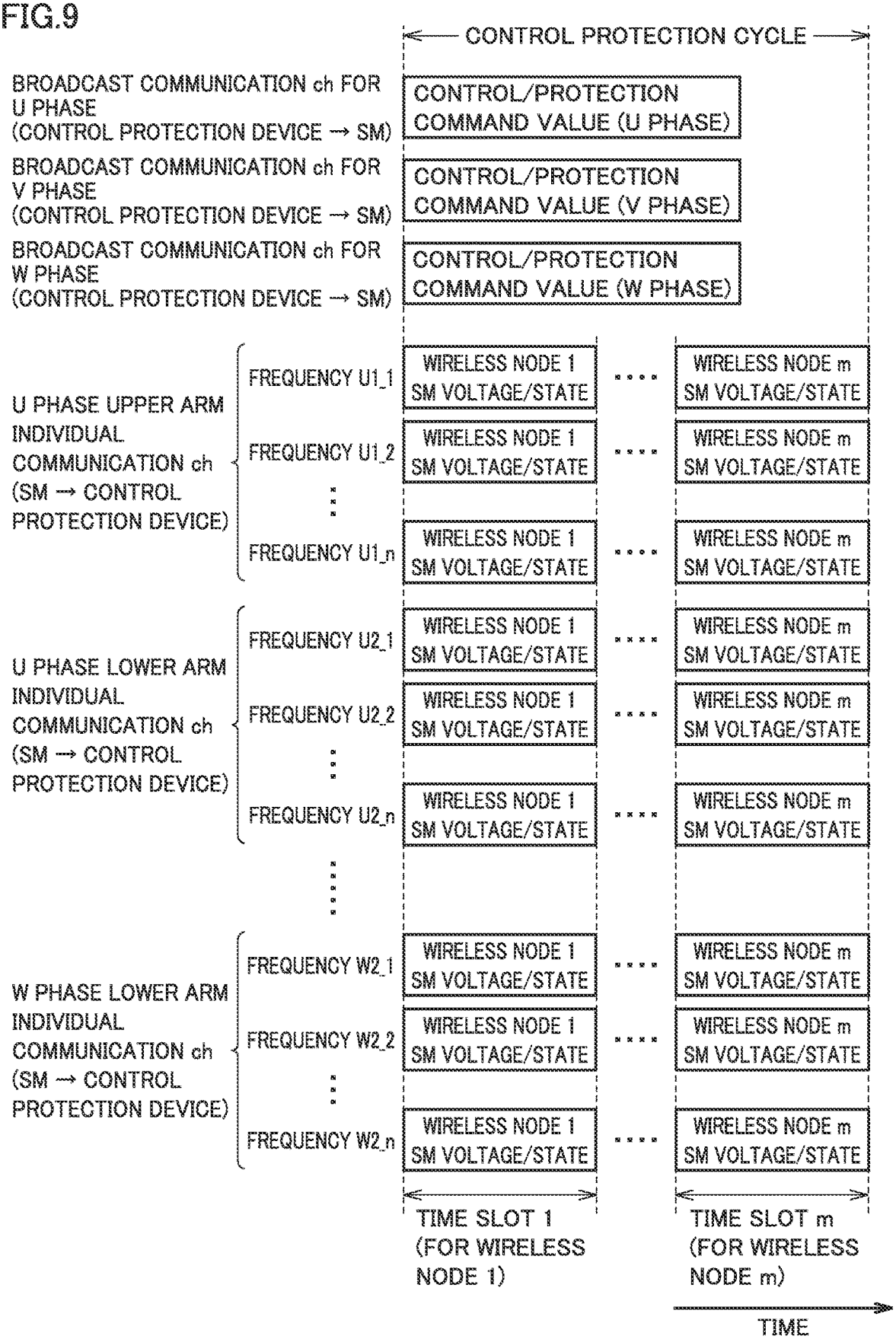
FIG. 9 is a timing chart showing a wireless communication flow.

FIG. 9 is a timing chart showing a wireless communication flow. In FIG. 9, a timing chart of a single cycle of control protection cycles is shown.

First, for communication in the downstream direction from control protection device 3 to each submodule side, a control command value such as a voltage command value, and a protection command value such as a gate block command are simultaneously notified to all submodules using frequency channels (BC_U, BC_V, BC_W) for broadcast communication.

Next, for communication in the upstream direction from each submodule to control protection device 3, individual information (capacitor voltage and device state, and so on) of submodule 7 is transferred by using combination of frequency division multiple access and time division multiple access.

Specifically, for each frequency channel, plurality of (m in FIG. 9) wireless nodes 62 are connected. For each of plurality of wireless nodes 62 connected, an individual time slot is allocated. That is, for each of frequency channels U1_1 to U1_$n$ for U phase upper arm, frequency channels U2_1 to U2_$n$ for U phase lower arm, frequency channels V1_1 to V1_$n$ for V phase upper arm, frequency channels V2_1 to V2_$n$ for V phase lower arm, frequency channels W1_1 to W1_$n$ for W phase upper arm, and frequency channels W2_1 to W2_$n$ for W phase lower arm, a plurality (m in FIG. 9) of time slots are allocated.

Each wireless node 62 has a clock function. Wireless node 62 conducts time synchronization by periodically receiving a timing signal from control protection device 3.

For communication between each wireless node 62 and wireless communication modules 22 to 27 of control protection device 3, a network technique for which time synchronization is guaranteed, such as TSN (Time-Sensitive Networking) is used, and thus time slot management is conducted. Specifically, each wireless node 62 recognizes a time slot allocated to itself by a node number and the clock function, and transmits individual information of submodule 7 in the time slot. As a result, it is possible to avoid time loss due to mediation of priority of communication or retransmission after communication collision, and it is possible to realize low delay communication with little dead time.

When p submodules 7 are connected to each wireless node 62, a total number of submodules 7 per one arm is n×m×p.

Effect of Embodiment 2

According to the power conversion device of Embodiment 2 described above, frequency division multiple access is used as the first multiple access method, and a time division multiple access method is used as the second multiple access method shown in Embodiment 1. Specifically, in communication of the upstream direction from submodule 7 side to control protection device 3, a plurality of (n) frequency channels are allocated for each arm, and plurality of (m) wireless nodes 62 are allocated to each frequency channel. Further, for each wireless node 62 allocated to each frequency channel, an individual time slot is allocated. As a result, it is possible to avoid time loss due to mediation of communication or retransmission after communication collision, and it is possible to realize low delay communication with little dead time.

Embodiment 3

In Embodiment 3, operation of PWM controller 66 of each wireless node 62 is described. Readjustment of phase shift amount in the case where submodule 7 fails in phase shift PWM control is particularly described.

[Operation of PWM Controller]

Figure 10:
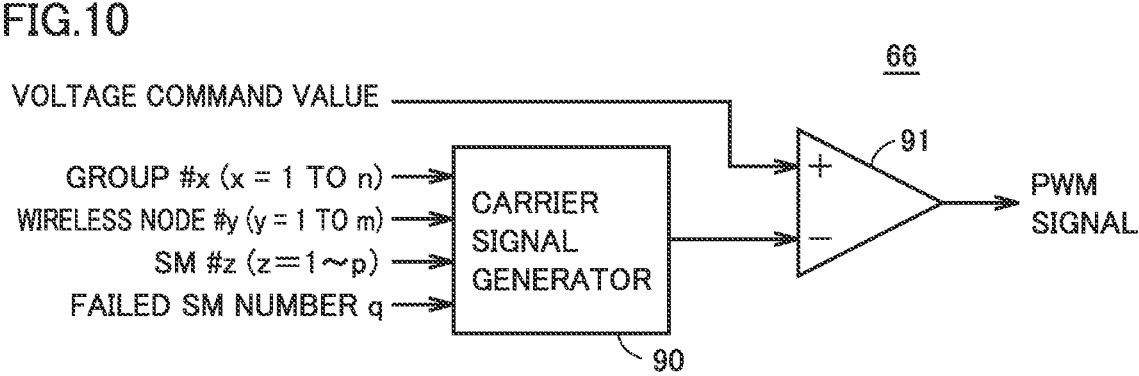
FIG. 10 is a block diagram for describing operation of PWM controller provided in a wireless node.

FIG. 10 is a block diagram for describing operation of PWM controller provided in a wireless node. Referring to FIG. 10, PWM controller 66 includes a carrier signal generator 90 and a comparator 91.

Carrier signal generator 90 outputs a carrier signal with a phase shift amount that differs among submodules 7. A carrier signal is, for example, a triangular wave. More specifically, carrier signal generator 90 generates a carrier signal having a phase shift amount in accordance with group number x, wireless node number y, submodule number z, and number q of failed submodules 7. It is to be noted that x=1 to n, y=1 to m, z=1 to p, and a total number of submodules per one arm is n×m×p.

Comparator 91 compares a voltage command value and a carrier signal. Comparator 91 generates such a gate pulse signal that becomes high level when the voltage command value is greater than the carrier signal, and that becomes low level when the voltage command value is less than or equal to the carrier signal.

Here, when a cycle of a carrier signal is represented by T, a phase shift amount Δ of the carrier signal for each one submodule is given by:

$$\Delta = T/(n \times m \times p) \quad (2).$$

It is assumed that phases of carrier signals corresponding to p submodules 7 connected to the same wireless node 62 are shifted by the above phase shift amount Δ. Further, it is assumed that the smaller group number x and wireless node number y, the smaller the phase shift of the carrier signal is. In this case, a phase shift amount D for each one wireless node 62 is given by $$D = T/(n \times m) \quad (3).$$

Further, a phase shift amount of z=1st carrier signal connected to y-th wireless node 62 of x-th group is represented by:

$$[m(x-1)+y-1] \cdot D \quad (4).$$

[Readjustment of Phase Shift Amount at Failure of Submodule]

As described by referring to FIG. 7, when submodule 7 fails, a contact of bypass switch SW is closed to short-circuit submodule 7. In this case, it is necessary to readjust the phase shift amount so that the phase shift amount of the carrier signal to be used for the remaining submodules 7 is not uneven.

In the case of readjusting the phase shift amount, it is desired to assign the phase shift amount evenly for all the submodules 7 constituting each arm excluding the failed submodule 7. However, in the case of power conversion device 1 of the present disclosure, it is necessary to communicate wirelessly between control protection device 3 and submodule 7 side, and thus labor and time are required for adjustment of the phase shift amount.

Here, in power conversion device 1 of the present disclosure, the phase shift amount is locally readjusted for each converter module 61. For example, it is assumed that q submodules 7 among p submodules 7 have failed in certain converter module 61. In this case, PWM controller 66 of converter module 61 sets phase shift amount Δ for each one submodule 7 at $$\Delta = D/(p-q) \quad (5).$$

In other converter modules 61 in which failed submodule 7 is not included, the phase shift amount is not readjusted.

FIG. 11 is a diagram for illustrating readjustment of a phase shift amount at the time of failure of a submodule. In FIG. 11, eight (p=8) submodules 7 are provided for each converter module 61. It is assumed that two (q=2) submodules (#3, #6), among eight submodules (#1 to #8) connected to y-th wireless node 62 of x-th group, have failed.

FIG. 11(A) shows the case where all of eight submodules 7 of wireless node 62 are normal. In this case, by dividing the phase range from $[m(x-1)+y-1] \cdot D$ to $[m(\times 1)+y] \cdot D$ into eight equal parts, a phase shift amount for each one submodule 7 is determined.

FIG. 11(B) shows the case where submodules 7 of #3 and #6 have failed. In this case, by dividing the phase range from $[m(x-1)+y-1] \cdot D$ to $[m(x-1)+y] \cdot D$ into six equal parts, a phase shift amount for each one submodule 7 is determined.

Effect of Embodiment 3

According to power conversion device 1 of Embodiment 3, when submodule 7 fails in certain converter module 61, readjustment is locally executed so that the phase shift amount for normal submodules 7 in converter module 61 is even. As a result, it is not necessary to readjust the phase shift amount for each submodule 7 of the entire arm, and thus it is possible to reduce the wireless communication amount between control protection device 3 and wireless node 62 of each submodule 7 side.

It is to be understood that the embodiments disclosed herein are illustrative, but are not restrictive in every respect. The scope of the present application is indicated by the appended claims rather than by the description described above, and it is intended that all modifications within the scope and meaning equivalent to the terms of the claims are included.

REFERENCE SIGNS LIST

1: power conversion device, 2: power converter, 3: control protection device, 4: leg circuit, 5: upper arm, 6: lower arm, 7: submodule, 12: AC circuit, 13: transformer, 14: DC circuit, 20: command generating section, 21 to 27: wireless communication module, 30, 31, 32, 65: transmitter, 33, 34, 63: receiver, 50: DC voltage command generating section, 51: AC voltage command generating section, 52: circulating current command generating section, 53: capacitor voltage command generating section, 54: arm voltage command generating section, 60: group (converter valve tower), 61: converter module, 62: wireless node, 66: controller, 67: collecting section, 68: optical fiber, 70: insulating container, 71: bottom plate, 72: lateral plate, 73: support, 80HB: bridge circuit, 81: gate driving section, 82A, 82B: switching device, 83A, 83B: diode, 84: DC capacitor (electricity storage element), 86N, 86P: I/O terminal, 87: voltage detecting section, 88: communicating section, 90: carrier signal generator, 91: comparator

The invention claimed is:

1. A power conversion device comprising:
an arm including a plurality of submodules, the plurality of submodules each being used as a unit converter, and being mutually cascade-connected; and
a plurality of wireless nodes each including a first receiver and a first transmitter,
each of the plurality of wireless nodes being connected to a corresponding plurality of submodules among the plurality of submodules constituting the arm by wired communication,
each of the plurality of wireless nodes transmitting a gate control signal based on a control protection command received via the first receiver to each of the corresponding plurality of submodules, and transmitting individual information received from the corresponding plurality of submodules via the first transmitter,
the plurality of wireless nodes being divided into a plurality of groups,
a plurality of channels of a first multiple access method each being allocated to a corresponding one of the plurality of groups, a plurality of subchannels of a second multiple access method each being allocated to a corresponding one of a plurality of wireless nodes included in each of the plurality of groups, the plurality of subchannels being divisions of a corresponding channel of the first multiple access method,
the first transmitter of each of the plurality of wireless nodes transmitting the individual information via an allocated channel and subchannel,
the power conversion device further comprising a control protection device,
the control protection device including:
a second transmitter to simultaneously transmit the control protection command that is common to the first receiver of each of the plurality of wireless nodes via a channel that is different from the plurality of channels of the first multiple access method, and
a plurality of second receivers each provided for a corresponding one of the plurality of groups, each second receiver receiving the individual information from the plurality of wireless nodes included in a corresponding group via a channel allocated to the corresponding group.

2. The power conversion device according to claim 1, wherein the first multiple access method is frequency division multiple access, and the second multiple access method is time division multiple access.

3. The power conversion device according to claim 2, wherein individual time slots are allocated to the plurality of wireless nodes included in each of the plurality of groups, and the first transmitter of each of the plurality of wireless nodes transmits the individual information in the allocated time slot.

4. The power conversion device according to claim 2, wherein each of the plurality of wireless nodes conducts time synchronization based on a timing signal received from the control protection device.

5. The power conversion device according to claim 1, wherein each of the plurality of wireless nodes generates the gate control signal according to a phase shift pulse width modulating method by comparing a voltage command value included in the control protection command with a carrier signal.

6. The power conversion device according to claim 5, wherein, when there is a failed submodule among the corresponding plurality of submodules, each of the plurality of wireless nodes locally adjusts a phase shift amount so that a phase shift amount corresponding to the remaining plurality of submodules excluding the failed submodule from the corresponding plurality of submodules is even.

7. The power conversion device according to claim 1, wherein
a plurality of wireless nodes constituting each of the plurality of groups, and a plurality of submodules connected to these wireless nodes are accommodated in a plurality of insulating containers that are provided to respectively correspond to the plurality of wireless nodes and are stacked in a vertical direction, and
each of the plurality of insulating containers accommodates a corresponding wireless node, and a plurality of submodules connected to the corresponding wireless node.

* * * * *